US012810082B2

(12) United States Patent
Townsend-Last

(10) Patent No.: US 12,810,082 B2
(45) Date of Patent: Nov. 24, 2026

(54) PREVIEWING OPERATIONS PERFORMED BY LARGE LANGUAGE MODEL TOOLS

(71) Applicant: Notion Labs, Inc., San Francisco, CA (US)

(72) Inventor: Simon Townsend-Last, New York, NY (US)

(73) Assignee: Notion Labs, Inc., San Francisco, CA (US)

( * ) Notice: Subject to any disclaimer, the term of this patent is extended or adjusted under 35 U.S.C. 154(b) by 174 days.

(21) Appl. No.: 18/654,913

(22) Filed: May 3, 2024

(65) Prior Publication Data

US 2026/0023935 A1 Jan. 22, 2026

Related U.S. Application Data

(60) Provisional application No. 63/616,450, filed on Dec. 29, 2023.

(51) Int. Cl.
*G06N 3/091* (2023.01)
*G06F 8/41* (2018.01)
(Continued)

(52) U.S. Cl.
CPC ........... *G06F 40/40* (2020.01); *G06N 3/0475* (2023.01)

(58) Field of Classification Search
CPC ...... G06F 40/40; G06F 16/338; G06F 16/334; G06F 16/9538; G06F 8/447; G06F 9/45516; G06F 8/31; G06F 8/35; G06F 8/51; G06F 40/20; G06F 16/4393; G06F 40/30; G06F 40/56; G06N 3/0475; G06N 3/10; G06N 20/00; G06N 3/0455; G06N 3/094
See application file for complete search history.

(56) References Cited

U.S. PATENT DOCUMENTS

| | | | |
|---|---|---|---|
| 7,512,840 | B2 | 3/2009 | Martin et al. |
| 12,118,320 | B2 | 10/2024 | Gelfenbeyn et al. |

(Continued)

OTHER PUBLICATIONS

CVPR, LiveCC: LearningVideoLLMwithStreamingSpeechTranscription at Scale, 9 pages (Year: 2025).*

(Continued)

*Primary Examiner* — Thuy Dao
(74) *Attorney, Agent, or Firm* — DORSEY & WHITNEY LLP; Lena Petrovic; Anni Siitonen

(57) ABSTRACT

A computing system performs automated tasks within a digital environment by causing a large language model (LLM) to generate computer-readable code that is executable by the computer system to perform the tasks. The computing system causes the LLM to generate a transcript of code to perform a task within a digital environment, where the task includes a plurality of operations to be performed within the digital environment. The LLM is configured to stream the computer-readable code to the transcript as the code is generated. The computing system iteratively manipulates strings within the transcript to generate executable portions of the computer-readable code from partially streamed outputs from the LLM. The computing system sequentially executes the generated executable portions of the computer-readable code to cause a preview of each of the plurality of operations to be sequentially output to the digital environment.

20 Claims, 13 Drawing Sheets

(51) Int. Cl.

| | |
|---|---|
| ***G06F 16/31*** | (2019.01) |
| ***G06F 16/334*** | (2025.01) |
| ***G06F 40/40*** | (2020.01) |
| ***G06N 3/045*** | (2023.01) |
| ***G06N 3/0475*** | (2023.01) |

(56) References Cited

U.S. PATENT DOCUMENTS

| | | | | |
|---|---|---|---|---|
| 12,367,641 | B2 * | 7/2025 | Yang | G06F 16/4393 |
| 12,373,492 | B2 * | 7/2025 | Mancuso | G06F 16/288 |
| 12,536,639 | B1 * | 1/2026 | Kalajan | G06Q 50/08 |
| 12,664,695 | B2 * | 6/2026 | Trzyna | G06F 40/44 |
| 2006/0184556 | A1 | 8/2006 | Tan et al. | |
| 2006/0206865 | A1 | 9/2006 | Reinhardt et al. | |
| 2009/0055686 | A1 | 2/2009 | Tsang | |
| 2013/0030792 | A1 | 1/2013 | Zhao et al. | |
| 2019/0332680 | A1 | 10/2019 | Wang et al. | |
| 2021/0375262 | A1 | 12/2021 | Wick et al. | |
| 2022/0101839 | A1 | 3/2022 | George et al. | |
| 2023/0112921 | A1 | 4/2023 | Cai et al. | |
| 2023/0125194 | A1 | 4/2023 | Mertens et al. | |
| 2024/0362209 | A1 | 10/2024 | Almaer et al. | |
| 2025/0045492 | A1 | 2/2025 | Koiek Akino et al. | |
| 2025/0111220 | A1 | 4/2025 | Jones et al. | |

OTHER PUBLICATIONS

ISA, International Search Report for International Application No. PCT/US2024/036450, mailed on Sep. 23, 2024, 4 pages.

Behnia et al., EW-Tune: A Framework for Privately Fine-TuningLarge Language Models with Differential Privacy, 2022, 2022 IEEE International Conference on Data Mining Workshops (ICDMW), p. 560-566.

* cited by examiner

PREVIEWING OPERATIONS PERFORMED BY LARGE LANGUAGE MODEL TOOLS

CROSS-REFERENCE TO RELATED APPLICATION

This application claims the benefit of U.S. Provisional Patent Application No. 63/616,450, filed Dec. 29, 2023, which is incorporated herein by reference in its entirety.

BACKGROUND

Many industries are turning to artificial intelligence tools to automate tasks that previously required significant human labor or were infeasible or impossible for humans to perform. However, despite advancement of these tools, integrating them into some types of environments has proven challenging. Existing tools, for example, lack the inherent capacity to autonomously comprehend and navigate structured software environments without extensive manual guidance. These limitations hamper the ability of artificial intelligence tools to perform tasks seamlessly and efficiently within these environments.

BRIEF DESCRIPTION OF THE DRAWINGS

Reference will now be made, by way of example, to the accompanying drawings which show example embodiments of the present application, and in which.

Figure 1:
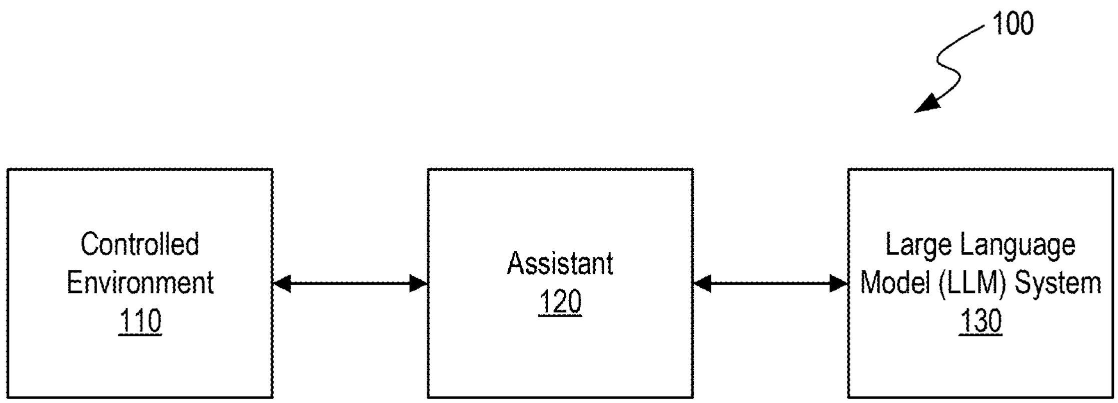
FIG. 1 is a high-level block diagram illustrating an environment in which an artificial intelligence assistant operates, according to some implementations.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Artificial intelligence tools provide many beneficial features, from automating routine tasks to performing complex analyses of large datasets. However, integrating these tools into an environment can prove challenging because the tools cannot autonomously navigate these environments. The present technology provides a structured workflow by which an artificial intelligence tool can interact with an environment to perform tasks in the environment. In this workflow, a computer system implements an artificial intelligence tool that performs tasks in the environment in response to natural language instructions received from a user. The tool leverages a large language model (LLM) to generate computer-readable instruction sets that can perform tasks autonomously in any environment. These computer-readable instruction sets can be executed by the computer system to perform the tasks.

As the LLM generates the computer-readable code for a task, the LLM streams characters of the code to a transcript. The streaming rate of LLM-generated content is relatively slow, such that it may take a few seconds, a few tens of seconds, or potentially even longer for complex tasks, for all of the code for performing a task to be output and executed by the computer system. If the computer system waits for until the complete code is available, there may be a significant delay between user inputs and the completion of the task. This delay can cause user frustration because the user does not have confirmation that the task is being performed. Furthermore, if the task is performed differently than the user intended (e.g., due to an ambiguity in the user's instruction), the user may have to input a new command and wait again for the computing system to execute the task, potentially leading to a several-minute delay that eradicates any advantage to the user that should have resulted from task automation.

To solve these problems, a computer system according to implementations herein processes partially streamed computer-readable code from the LLM to manipulate the code into portions that can be executed before the LLM has finished streaming the code. According to some implementations, the computer system instructs a large language model (LLM) to generate a transcript of computer-readable code for performing a task within a digital environment, where the task includes a plurality of operations to be performed within the digital environment. The computer system iteratively manipulates strings within the transcript to generate executable portions of the computer-readable code from partially streamed outputs from the LLM. The generated executable portions of the computer-readable code are sequentially executed to cause a preview of each of the plurality of operations to be sequentially output to the digital environment.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Artificial Intelligence Assistant Environment

FIG. 1 is a high-level block diagram illustrating an environment 100 in which an artificial intelligence assistant operates, according to some implementations. As shown in FIG. 1, the environment 100 can include a controlled environment 110, an assistant 120, and a large language model (LLM) 130.

The controlled environment 110 is a physical or virtual environment that is operated by one or more computing systems. In an example, the controlled environment 110 is a virtual environment that is accessed via user devices, such as a website, a web application, or a native application. Other example controlled environments 110 include physical systems that are operated by controllers coupled to computing systems, such as manufacturing or testing facilities that employ robotic systems to perform tasks. An example controlled environment 110, in the form of a data and project management platform, is described with respect to FIG. 3.

A user can interact with the controlled environment 110 via a user device. When the controlled environment 110 is a virtual environment, for example, the user device can access and display pages or content from the virtual environment to a user. A user can read or edit the environment's content from the user device. Users can also interact with the assistant 120 via the user devices to automate tasks in the environment 110.

The LLM 130 includes one or more language models that are configured to generate text-based outputs in response to prompts. The LLM 130 can include any commercially available or custom models, or a set or ensemble of two or more models. Example features of LLMs are described with respect to FIG. 5.

The LLM 130 can be trained to manipulate computer-readable instructions and operate application programming interfaces (APIs) in order to perform tasks in the controlled environment 110. During training, the LLM 130 can be provided with example transcripts that include sample instructions from a user and corresponding code to implement a task in the controlled environment. Training the LLM 130 can include, for example, preference model training that trains the LLM to predict a human preference based on ranked or contrastive pairs, supervised learning that uses human feedback data or synthetic data to train the LLM to predict a next token in a sequence, or reinforcement learning that penalizes the LLM for outputs that do not satisfy specified preference requirements.

The assistant 120 is a computer system or software application that communicates with the controlled environment 110 and a user to perform tasks in the environment 110 based on natural language inputs received from the user. In various implementations, the assistant 120 can communicate with the computer systems that implement or control the environment 110 via a network such as a local network or the Internet, or can be integrated into a device or system that controls the environment. The assistant 120 can interface with the controlled environment 110 to perform observations of the environment and to effect actions within the environment.

Figure 2A:
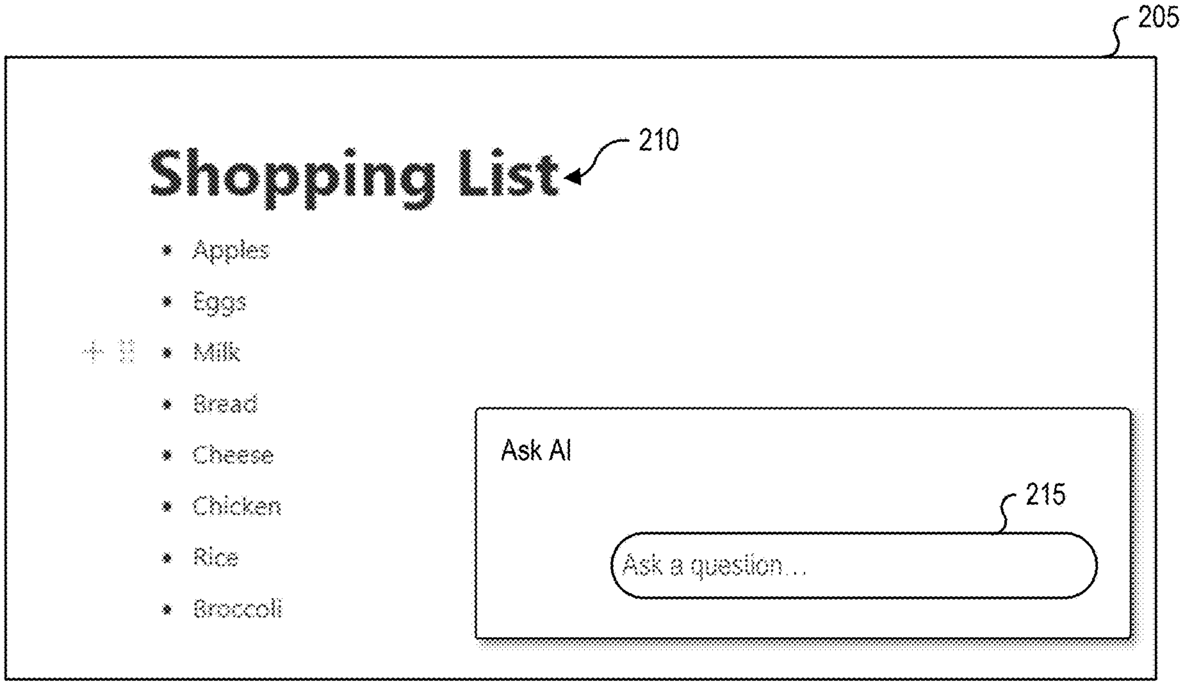
FIGS. 2A-2E illustrate example interfaces for a user to interact with an artificial intelligence assistant.

An example interface for a user to interact with the assistant 120 is illustrated in FIGS. 2A-2E. The example in FIG. 2A illustrates a page 205 within a data management platform, as an example controlled environment 110. The page 205 includes a text block 210 entitled "Shopping list" with bullet points under the title.

A user of the data management platform can interact with the assistant 120 to perform tasks associated with the page 205. Any of a variety of mechanisms for accessing the functionality of the assistant 120 can be provided within, or associated with, the environment 110. In the example in FIG. 2A, a user can invoke a text box 215 to input a natural language instruction. For example, the text box 215 can be displayed within the page 205 or in a modal window or sidebar associated with the page 205.

Figure 2B:
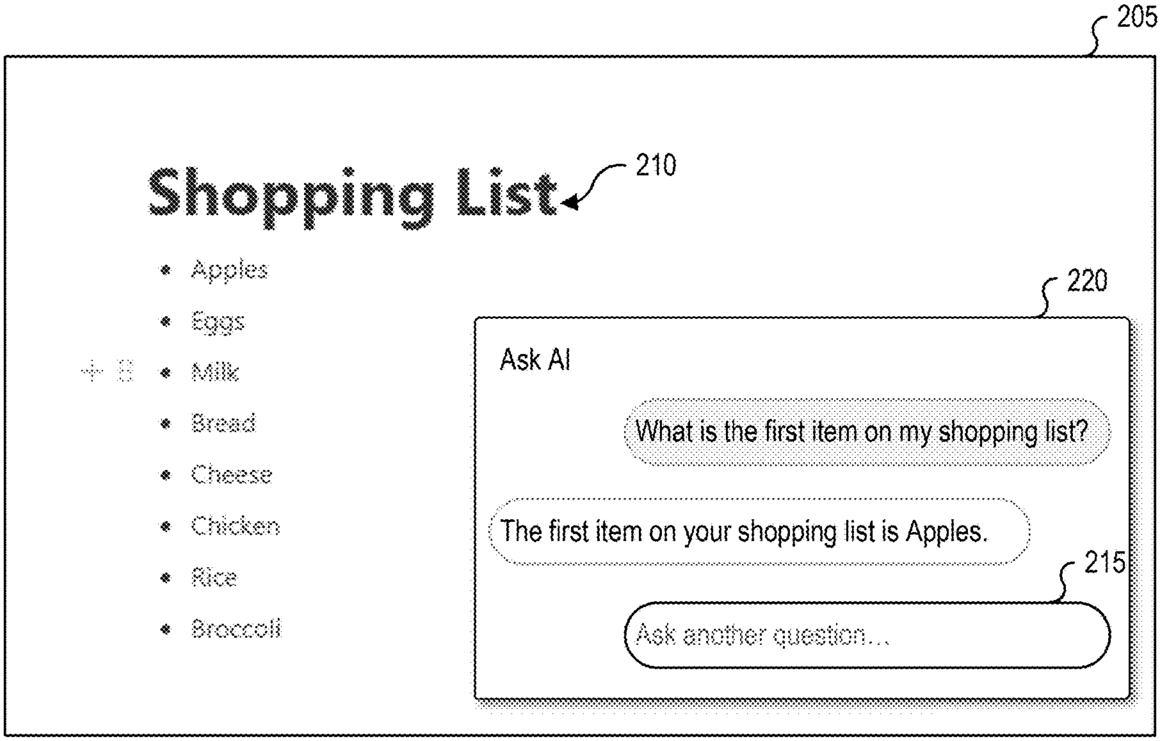

In one example, illustrated in FIG. 2B, a user interacts with the assistant 120 via a chat-like interface 220. The example of FIG. 2B illustrates that the user has queried the assistant for information about the page, asking "what is the first item on the shopping list?" In response, the assistant 120 outputs the text, "The first item on your shopping list is Apples." The response from the assistant 120 can be provided within the chat interface, in some implementations.

Figure 2C:
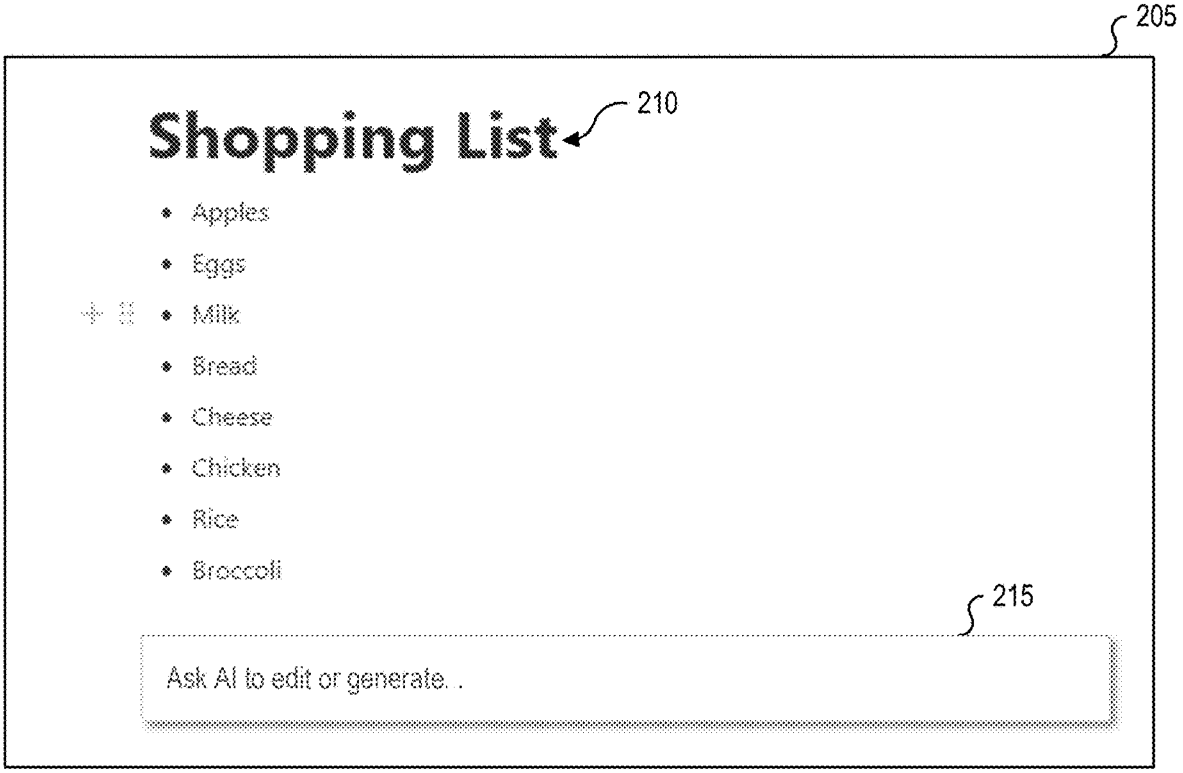
Figure 2D:
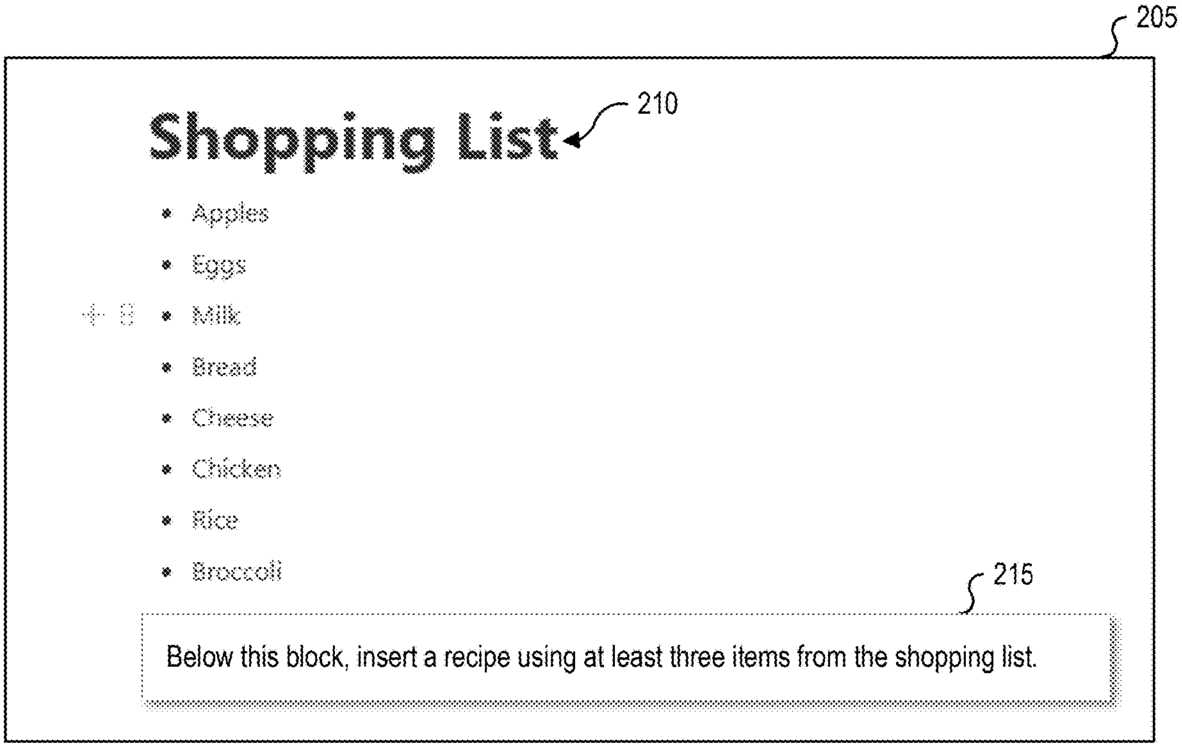
Figure 2E:
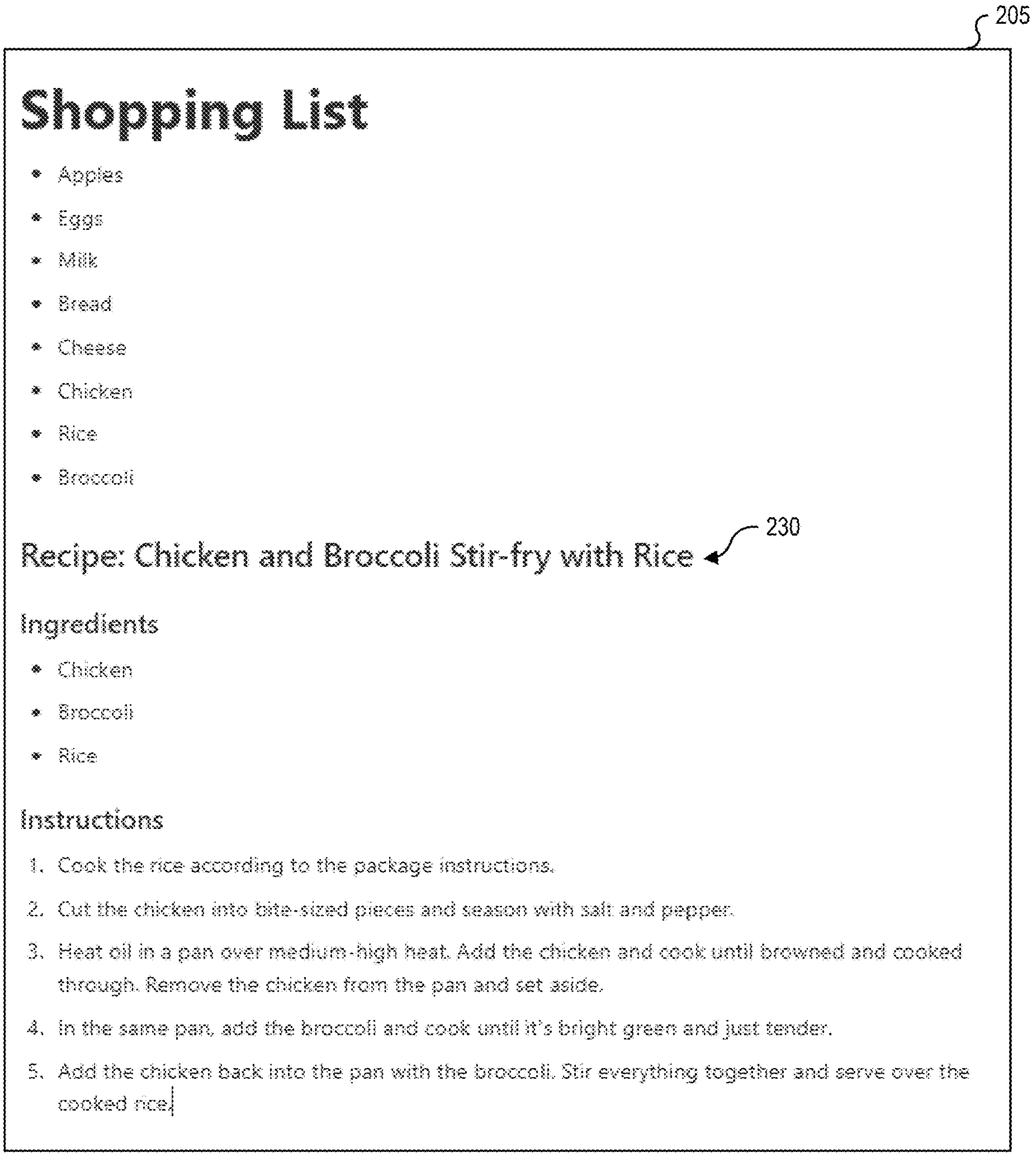

A user can also interact with the assistant 120 within the context of the page 205 to modify the page's content. In FIG. 2C, for example, a text box 215 is provided as a new block on the page 205. In FIG. 2D, the user has entered the natural language instruction "Below this block, insert a recipe using at least three items from the shopping list." In response, the assistant 120 generates a recipe and inserts the generated text into a new block 230 on the page, as shown in FIG. 2E, replacing the user's natural language instruction.

Users can interact with the assistant 120 in ways other than those illustrated in FIGS. 2A-2E. For example, a user can chat with an assistant 120 via an application that is separate from the controlled environment 110, including third-party social media applications or chat, instant messaging, or collaboration platforms such as Slack, Webex, or Microsoft Teams. Likewise, a user can interact with an assistant 120 within a first application (e.g., a Slack thread) to perform tasks in a second application linked to the first application (e.g., a data management platform linked to the Slack thread). Alternatively, a custom application that is accessible to users via a user's computing device can integrate with the controlled environment 110 to effect changes in the environment based on user inputs at the custom application.

As will be described further below, the assistant 120 generates computer program code in order to perform observations of the controlled environment 110 and to effects actions within the environment. During a user's interactions with the assistant 120, the assistant 120 generates a transcript that represents a sequence of inputs, outputs, or observations and that maintains a persistent state of this sequence. The transcript includes computer-readable inputs and computer program code that is executed by the assistant 120 to perform tasks related to the controlled environment 110. For example, the transcript includes a set of extensible markup language (XML), JavaScript, or a combination of XML and JavaScript. Provided below is a portion of an example transcript generated during the chat interaction illustrated in FIG. 2B, in which the assistant observes and outputs an identification of the first item in a list entitled "Shopping List:"

```
[
  {
    "id": 0,
    "type": "context",
    "context": {...}
  },
  {
    "id": 1,
    "type": "assistant",
    "value": "<load-page id=\"0\"/>"
  },
  {
```

-continued

```
    "type": "observation",
    "observationType": "page",
    "pageId": "0",
    "value": "<page id=\"0\"><property-title name=\"Title\"/><text
      id=\"2\">Shopping
      list:</text><uli id=\"3\">Apples</uli><uli id=\"4\
    "id": 2
  },
  {
    "id": 3,
    "type": "human",
    "value": "<chat><text>What's the first item on my shopping
list?</text></chat>"
  }
]
```

The transcript can include a series of steps, where each step includes computer program instructions associated with user steps or assistant steps. User steps in the transcript can include computer-readable inputs that are generated based on natural language instructions received from a user. The computer-readable inputs can include translating a user's natural language input into a computer-readable form. For example, a user enters, at a text entry box associated with the assistant 120, the natural language instruction, "Please update this page to include this information: {information}." When generating the transcript, the assistant 120 translates this instruction into the following XML:

<chat><text>Please update this page to incorporate this information: {information} </text></chat>

At least some user steps can also include a context of the controlled environment 110 at the time a user input was received. The context can include, for example, a state of the environment 110 (e.g., a page the user is viewing or a thread in a collaboration application with which a user is interacting), a date and time of the user input, previous interactions between the user and the assistant 120, or other information that enables the assistant 120 to perform tasks. In some implementations, context is included in any user step that initiates a new interaction with the assistant 120. Context may not be included in user steps of the transcript that continue a prior interaction with the assistant 120, such as the user continuing a chat conversation with the assistant or the user asking the assistant to revise content that the assistant previously generated.

Assistant steps in the transcript include observation steps and action steps. Observations of the controlled environment 110 can include computer program code that, when executed, causes the assistant to observe a value or state of the controlled environment 110. For example, an observation step can return the name of an element on a page or a block of text that matches a query, retrieve a value from a table, identify a relevant document in a document repository, observe properties of elements on a page, determine a last edit date of a document, and so forth.

Action steps in the transcript can include computer program code that, when executed, modifies properties or content within the controlled environment 110. For example, when the controlled environment 110 is a virtual environment such as a data management platform, action steps can include commands to load a page, insert content before or after a specified point on a page, insert content inside of another content block, move content on a page, delete content, or set or modify properties or attributes of items on a page.

Some tasks requested by users are deterministic tasks for which the task result is expected to be a certain, predictable output. For example, reading a value from the environment 110, writing a certain value to the environment, or performing a mathematical operation are deterministic tasks. Other tasks are non-deterministic tasks, such as if a user requests a summary of a document or a recipe that includes items from a shopping list. To perform such deterministic or non-deterministic tasks, at least some implementations of the assistant 120 can cause the LLM to generate XML or some other code, like JavaScript.

In an example, a user inputs a natural language instruction to add content to a structured digital environment, such as a data management platform, where the instruction specifies a location within the environment at which the content should be added. The assistant 120 processes the user's instruction and adds a computer-readable input for the instruction to a transcript. The assistant 120 then generates a prompt to the LLM 130 to generate computer-readable code to perform the requested task. In response, the LLM 130 generates code that is configured to use context of the environment, provided with the computer-readable input or referenced earlier in the transcript, to identify the location within the structured digital environment at which the content is to be inserted. The code generated by the LLM 130 also is executable to cause the content to be written to the structured digital environment at the identified location. The code generated by the LLM 130 is added to the transcript and executed by the assistant 120 to complete the task. In another example, the task requested to be performed by the assistant 120 can be either deterministic or non-deterministic.

In another example, a user inputs a natural language instruction at a data management platform that instructs the assistant 120 to generate content for output via a chat thread (e.g., on a third-party messaging or collaboration platform). To write content to a chat thread, the assistant 120 can collaborate with the LLM 130 on a transcript in a manner like that described in the example above. However, when generating a computer-readable input based on the natural language instruction, the assistant 120 can include a context of the chat thread in the input to enable the assistant to write content to the specified chat thread based on the code generated by the LLM 130. Similarly, if a user inputs a natural language instruction within a chat thread that instructs the assistant 120 to perform a task in a data management platform, the computer-readable input generated by the assistant 120 can include a context of the data management platform.

The assistant 120 can also validate outputs from the LLM 130 to ensure that tasks are performed correctly. The LLM 130 may at times output incorrect code, for example by hallucinating APIs or libraries that do not exist in the language in which the code is written or that are not accessible to the assistant 120. The LLM 130 may also employ improper syntax, generate incorrect data types, fail to fully implement algorithms, or otherwise generate code with bugs, logic errors, or other problems. Errors in the code can also arise based on incorrect inputs by a human user or based on changes to the controlled environment 110. For example, an error may arise when a user requests an update to a table entitled "Quarterly Finances" but the controlled environment 110 has two tables with the same name.

To validate the computer program code output by the LLM 130, the assistant 120 executes instructions and observes results of these executions. Generally, if an observed result matches an expected task response, the assistant 120 determines that the instructions output by the LLM 130 are valid. If the assistant 120 detects an error in an observed result, the assistant 120 causes the LLM 130 to produce new code to correct the error before a task response is finalized. A process for the assistant 120 to validate code written by the LLM 130 is described further with respect to FIG. 7.

Furthermore, the assistant 120 can preview operations within a digital environment by manipulating partially streamed code from the LLM into valid states while the LLM is still generating code. A process for generating previews is described with respect to FIG. 8.

Block Data Model

Some implementations of the controlled environment 110 are structured according to a block data model ("block model"). According to these implementations, the blocks are dynamic units of information that can be transformed into other block types and move across workspaces in response to either user inputs or based on automated tasks performed by a computing system (such as the assistant 120). The block model allows users or the computer system to customize how information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before"

data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

Figure 3:
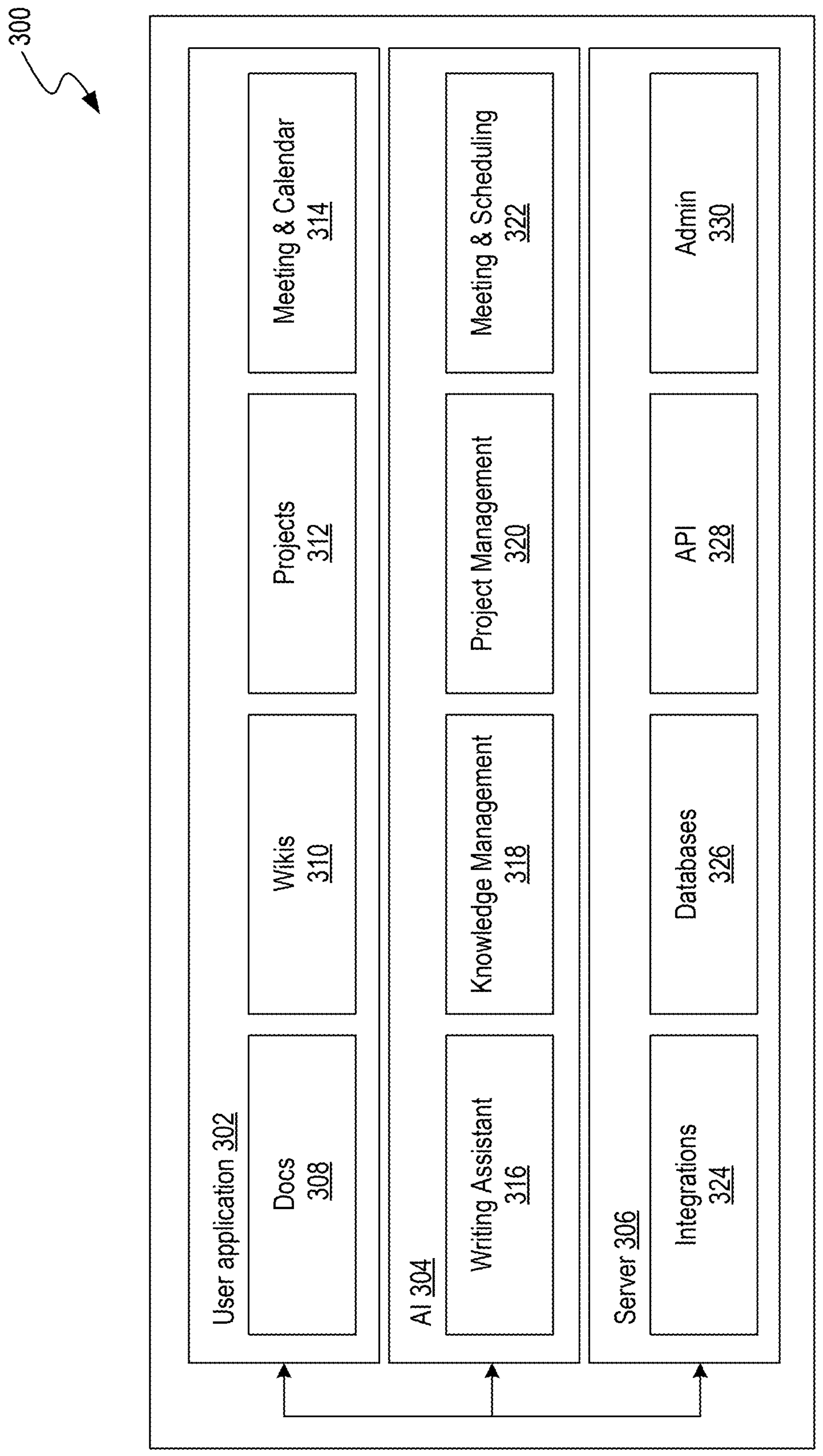
FIG. 3 is a block diagram illustrating a platform, which may be used to implement examples of the present disclosure.

FIG. 3 is a block diagram of a platform 300, aspects of which can function as an example controlled environment 110. The platform 300 provides users with an all-in-one workspace for data and project management. The platform 300 can include a user application 302, an AI tool 304, and a server 306. The user application 302, the AI tool 304, and the server 306 are in communication with each other via a network.

In some implementations, the user application 302 is a cross-platform software application configured to work on several computing platforms and web browsers. The user application 302 can include a variety of templates. A template refers to a prebuilt page that a user can add to a workspace within the user application 302. The templates can be directed to a variety of functions. Exemplary templates include a docs template 308, a wikis template 310, a projects template 312, and a meeting and calendar template 314. In some implementations, a user can generate, save, and share customized templates with other users.

The user application 302 templates can be based on content "blocks." For example, the templates of the user application 302 include a predefined and/or pre-organized set of blocks that can be customized by the user. Blocks are content containers within a template that can include text, images, objects, tables, maps, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 304 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 308 is a document generation and organization tool that can be used for generating a variety of documents. For example, the docs template 308 can be used to generate pages that are easy to organize, navigate, and format. The wikis template 310 is a knowledge management application having features similar to the pages generated by the docs template 308 but that can additionally be used as a database. The wikis template 310 can include, for example, tags configured to categorize pages by topic and/or include an indication of whether the provided information is verified to indicate its accuracy and reliability. The projects template 312 is a project management and note-taking software tool. The projects template 312 can allow the users, either as individuals or as teams, to plan, manage, and execute projects in a single forum. The meeting and calendar template 314 is a tool for managing tasks and timelines. In addition to traditional calendar features, the meeting and calendar template 314 can include blocks for categorizing and prioritizing scheduled tasks, generating to-do and action item lists, tracking productivity, etc. The various templates of the user application 302 can be included under a single workspace and include synchronized blocks. For example, a user can update a project deadline on the projects template 312, which can be automatically synchronized to the meeting and calendar template 314. The various templates of the user application 302 can be shared within a team, allowing multiple users to modify and update the workspace concurrently.

The AI tool 304 is an integrated AI assistant that enables AI-based functions for the user application 302. In one example, the AI tool 304 is based on a neural network architecture, such as the transformer 512 described in FIG. 5. The AI tool 304 can interact with blocks embedded within the templates on a workspace of the user application 302. For example, the AI tool 304 can include a writing assistant tool 316, a knowledge management tool 318, a project management tool 320, and a meeting and scheduling tool 322. The different tools of the AI tool 304 can be interconnected and interact with different blocks and templates of the user application 302.

The writing assistant tool 316 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 316 can generate a block including a text that describes the climate in New York. As another example, in response to a prompt that requests ideas on how to name a pet, the writing assistant tool 316 can generate a block including a list of creative pet names. The writing assistant tool 316 can also operate to modify existing text. For example, the writing assistant can shorten, lengthen, or translate existing text, correct grammar and typographical errors, or modify the style of the text (e.g., a social media style versus a formal style).

The knowledge management tool 318 can use AI to categorize, organize, and share knowledge included in the workspace. In some implementations, the knowledge management tool 318 can operate as a question-and-answer assistant. For example, a user can provide instructions on a prompt block to ask a question. In response to receiving the question, the knowledge management tool 318 can provide an answer to the question, for example, based on information included in the wikis template 310. The project management tool 320 can provide AI support for the projects template 312. The AI support can include auto filling information based on changes within the workspace or automatically track project development. For example, the project management tool 320 can use AI for task automation, data analysis, real-time monitoring of project development, allocation of resources, and/or risk mitigation. The meeting and scheduling tool 322 can use AI to organize meeting notes, unify meeting records, list key information from meeting minutes, and/or connect meeting notes with deliverable deadlines.

The server 306 can include various units (e.g., including compute and storage units) that enable the operations of the AI tool 304 and workspaces of the user application 302. The server 306 can include an integrations unit 324, an application programming interface (API) 328, databases 326, and an administration (admin) unit 330. The databases 326 are configured to store data associated with the blocks. The data associated with the blocks can include information about the content included in the blocks, the function associated with the blocks, and/or any other information related to the blocks. The API 328 can be configured to communicate the block data between the user application 302, the AI tool 304, and the databases 326. The API 328 can also be configured to communicate with remote server systems, such as AI systems. For example, when a user performs a transaction within a block of a template of the user application 302 (e.g., in a docs template 308), the API 328 processes the transaction and saves the changes associated with the transaction to the database 326. The integrations unit 324 is a tool connecting the platform 200 with external systems and software platforms. Such external systems and platforms can include other databases (e.g., cloud storage spaces), messaging software applications, or audio or video conference applications. The administration unit 330 is configured to manage and maintain the operations and tasks of the server 306. For example, the administration unit 330 can manage user accounts, data storage, security, performance monitoring, etc.

Figure 4:
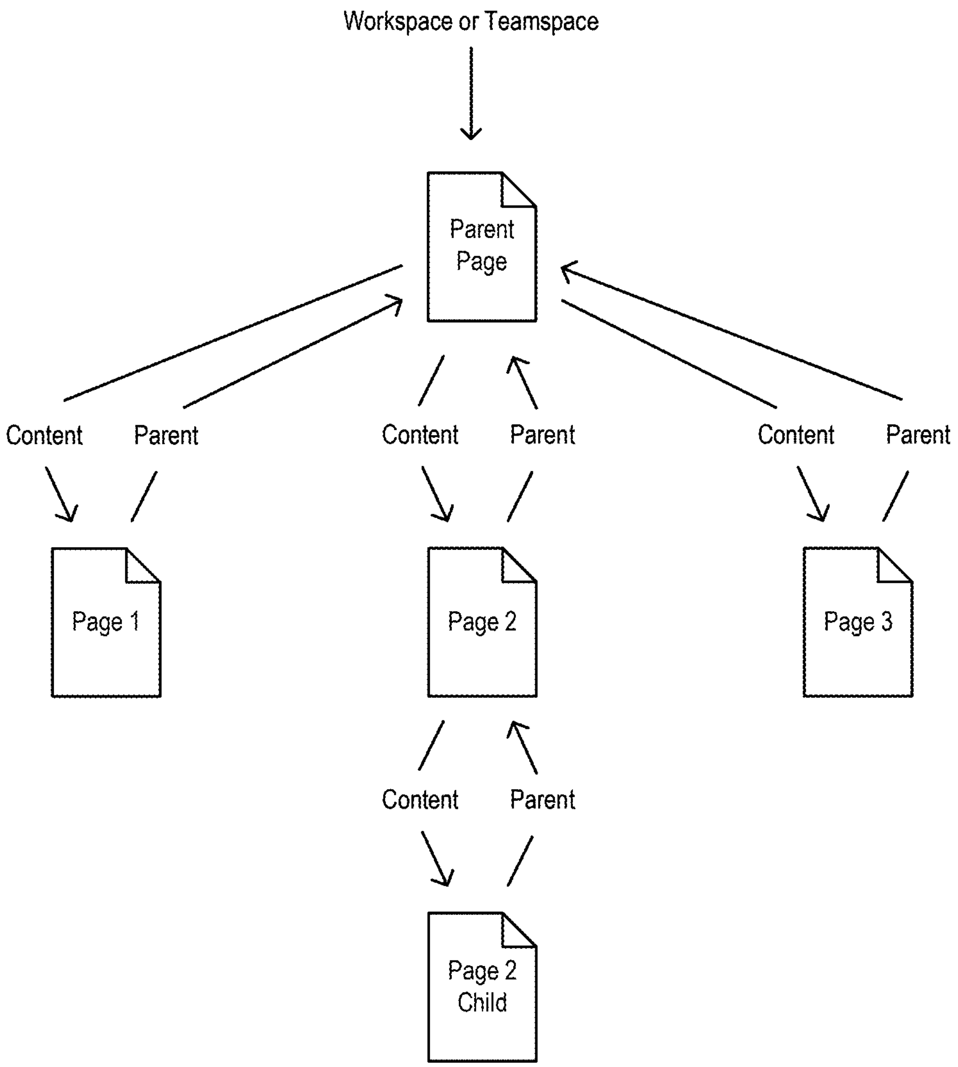
FIG. 4 is a block diagram illustrating a hierarchical organization of pages in a workspace.

FIG. 4 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 4. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 4, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows in FIG. 4 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 4 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 5:
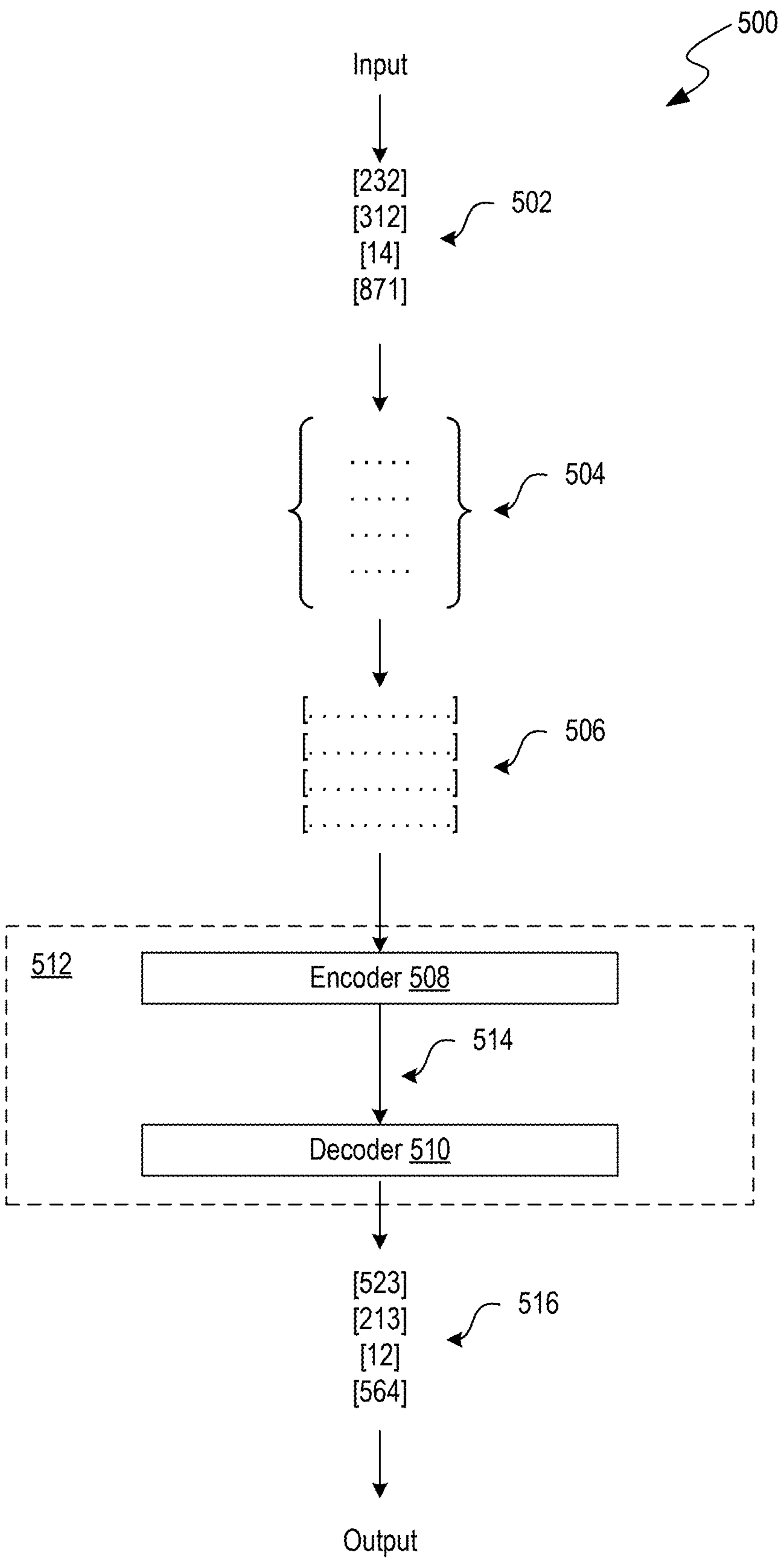
FIG. 5 is a block diagram of a transformer neural network, which may be used in examples of the present disclosure.

FIG. 5 is a block diagram of an example transformer 512. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 512 includes an encoder 508 (which can include one or more encoder layers/blocks connected in series) and a decoder 510 (which can include one or more decoder layers/blocks connected in series). Generally, the encoder 508 and the decoder 510 each include multiple neural network layers, at least one of which can be a self-attention layer. The parameters of the neural network layers can be referred to as the parameters of the language model.

The transformer 512 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 512 is trained to perform certain functions on other input formats than natural language input. For example, the input can include objects, images, audio content, or video content, or a combination thereof.

The transformer 512 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 5 illustrates an example of how the transformer 512 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 5, a short sequence of tokens 502 corresponding to the input text is illustrated as input to the transformer 512. Tokenization of the text sequence into the tokens 502 can be performed by some pre-processing tokenization module such as, for example, a byte-pair encoding tokenizer (the "pre" referring to the tokenization occurring prior to the processing of the tokenized input by the LLM), which is not shown in FIG. 5 for brevity. In general, the token sequence that is inputted to the transformer 512 can be of any length up to a maximum length defined based on the dimensions of the transformer 512. Each token 502 in the token sequence is converted into an embedding vector 506 (also referred to as "embedding 506").

An embedding 506 is a learned numerical representation (such as, for example, a vector) of a token that captures some semantic meaning of the text segment represented by the token 502. The embedding 506 represents the text segment corresponding to the token 502 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 506 corresponding to the "write" token will be closer to another embedding corresponding to the "jot down" token in the vector space as compared to the distance between the embedding 506 corresponding to the "write" token and another embedding corresponding to the "summary" token.

The vector space can be defined by the dimensions and values of the embedding vectors. Various techniques can be used to convert a token 502 to an embedding 506. For example, another trained ML model can be used to convert the token 502 into an embedding 506. In particular, another trained ML model can be used to convert the token 502 into an embedding 506 in a way that encodes additional information into the embedding 506 (e.g., a trained ML model can encode positional information about the position of the token 502 in the text sequence into the embedding 506). In some implementations, the numerical value of the token 502 can be used to look up the corresponding embedding in an embedding matrix 504, which can be learned during training of the transformer 512.

The generated embeddings 506 are input into the encoder 508. The encoder 508 serves to encode the embeddings 506 into feature vectors 514 that represent the latent features of the embeddings 506. The encoder 508 can encode positional information (i.e., information about the sequence of the input) in the feature vectors 514. The feature vectors 514 can have very high dimensionality (e.g., on the order of thousands or tens of thousands), with each element in a feature vector 514 corresponding to a respective feature. The numerical weight of each element in a feature vector 514 represents the importance of the corresponding feature. The space of all possible feature vectors 514 that can be generated by the encoder 508 can be referred to as a latent space or feature space.

Conceptually, the decoder 510 is designed to map the features represented by the feature vectors 514 into meaningful output, which can depend on the task that was assigned to the transformer 512. For example, if the transformer 512 is used for a translation task, the decoder 510 can map the feature vectors 514 into text output in a target language different from the language of the original tokens 502. Generally, in a generative language model, the decoder 510 serves to decode the feature vectors 514 into a sequence of tokens. The decoder 510 can generate output tokens 516 one by one. Each output token 516 can be fed back as input to the decoder 510 in order to generate the next output token 516. By feeding back the generated output and applying self-attention, the decoder 510 can generate a sequence of output tokens 516 that has sequential meaning (e.g., the resulting output text sequence is understandable as a sentence and obeys grammatical rules). The decoder 510 can generate output tokens 516 until a special [EOT] token (indicating the end of the text) is generated. The resulting sequence of output tokens 516 can then be converted to a text sequence in post-processing. For example, each output token 516 can be an integer number that corresponds to a vocabulary index. By looking up the text segment using the vocabulary index, the text segment corresponding to each output token 516 can be retrieved, the text segments can be concatenated together, and the final output text sequence can be obtained.

In some implementations, the input provided to the transformer 512 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 328 in FIG. 3). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

AI Assistant Workflow

Figure 6:
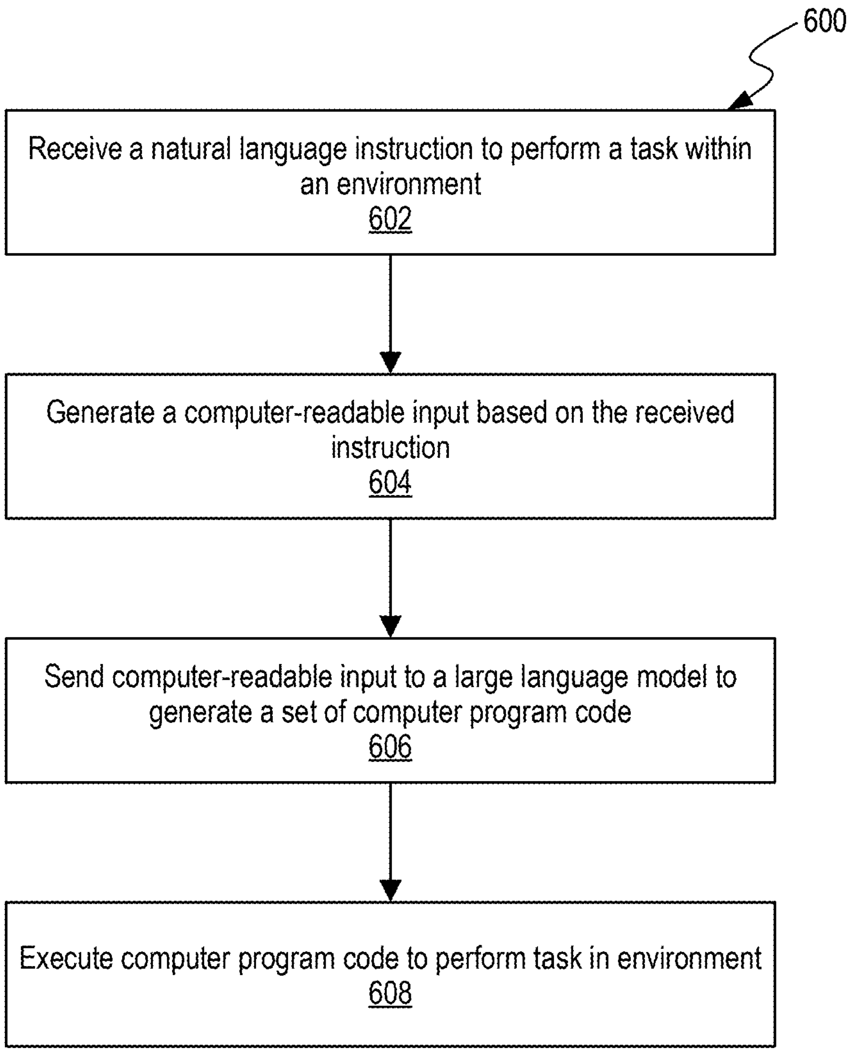
FIG. 6 is a flowchart illustrating a process for controlling an environment using an artificial intelligence assistant, according to some implementations.

FIG. 6 is a flowchart illustrating a process 600 for controlling an environment using an artificial intelligence assistant, according to some implementations. The process 600 can be performed by a computing system, such as the assistant 120 described above or a computing system that implements the assistant 120. Other implementations of the process 600 include additional, fewer, or different steps, or perform the steps in different orders.

As shown in FIG. 6, the computer system receives, at 602, an instruction to perform a task within an environment that is communicatively coupled to the computer system, such as the controlled environment 110. The instruction can be a natural language instruction that is input by a user of the computer system or the environment. In an example, a user interacts with the computer system to perform a task within the platform 300 described with respect to FIG. 3. A user instruction can be input via any of a variety of sources, such as a chat-like interface shown in FIG. 2B or a text entry box displayed within a page of the environment as shown in FIG. 2D.

At 604, the computer system generates a computer-readable input based on the received instructions. The computer-readable input can include a context of the environment, as well as a computer-readable form of the user's natural language instructions.

At 606, the computer system sends the computer-readable input to a large language model (LLM) to cause the LLM to generate a set of computer program code, such as XML or JavaScript, to perform the task requested by the user. The LLM can be trained using pairs of user instructions and code to perform the instructions, such that the LLM is configured to process the computer-readable input and to generate computer program code in response. Depending on the task that is to be performed or the structure of the environment, the computer system can cause the LLM to generate different types of computer program code. The computer system can validate the output of the LLM to ensure that the code is correct, such as verifying that it employs real APIs, functions, and syntax within the appropriate coding language.

At 608, after the LLM has returned the generated computer program code, the computer system executes the code to perform the task in the environment.

Using the process illustrated in FIG. 6, the computer system can iteratively add computer-readable inputs and LLM-produced code to a transcript that enables the computer system to perform tasks in the environment. After performing a first task at 608, the computer system can receive subsequent natural language inputs from users. Based on these subsequent inputs, the computer system can correct previous task results (e.g., by instructing the LLM to correct previously generated code or to output new code based on updated contexts or task parameters) or perform additional tasks in the environment.

XML Interpreter

As discussed with respect to FIG. 6, some implementations of a workflow of interactions between an AI assistant (such as the assistant 120) and an LLM include causing the LLM to generate XML to perform various tasks. However, the XML produced by LLM may sometimes fail to perform the desired task, whether due to hallucinations by the LLM, errors in the prompts generated by the assistant, modifications to or ambiguities in the environment, or other inherent or exogenous factors. To ensure that tasks can be performed correctly, some implementations of the assistant 120 therefore employ a process to validate the XML that is produced by the LLM 130.

Figure 7:
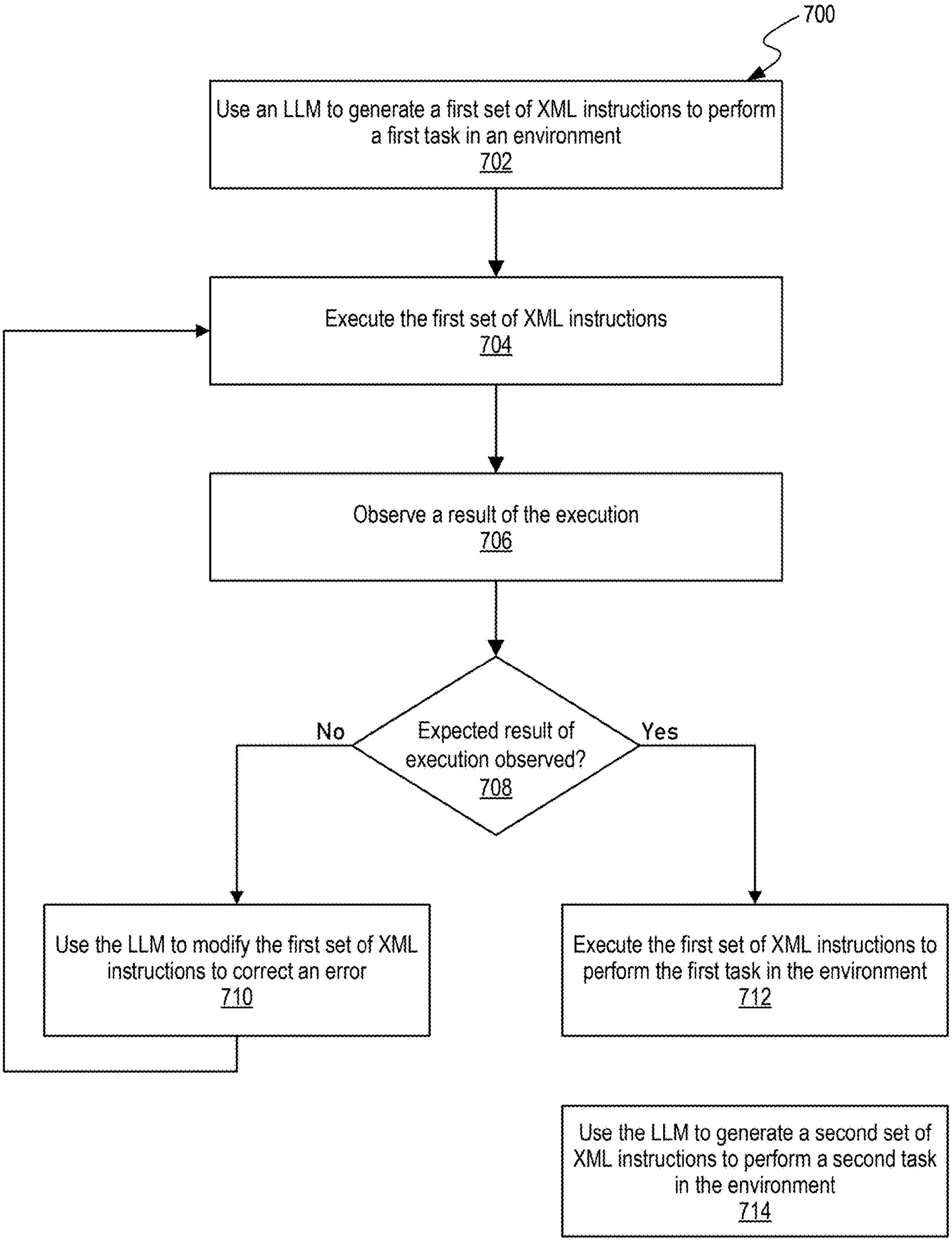
FIG. 7 is a flowchart illustrating a process for implementing an XML interpreter to validate instructions that are written by or with the assistance of a large language model, according to some implementations.

FIG. 7 is a flowchart illustrating a process 700 for implementing an XML interpreter to validate instructions that are written by or with the assistance of a large language model, according to some implementations. The process 700 can be performed by a computer system such as the assistant 120 described above. Other implementations of the process 700 include additional, fewer, or different steps, or perform the steps in different orders.

At 702, the computer system uses an LLM to generate a first set of XML instructions associated with performing a first task in an environment coupled to the computing system. Like implementations described above, the environment in which the task is performed can be the data management platform, a collaboration platform, or any other physical or virtual environment whose state or content can be remotely read and/or modified by a computing system. The first task can include any action to retrieve a current state of the environment or to modify a current state of the environment, such as observing a value stored in the data management platform or writing content to a chat thread within the collaboration platform. In some cases, the computer system causes the LLM to generate the first set of XML instructions in response to a natural language input from a user to perform the first task or to perform a series of tasks that includes the first task. Alternatively, the computer system can trigger generation of the first set of XML in response to another task performed by the computer system.

After receiving a first set of XML instructions from the LLM, the computer system executes the first set of instructions (at 704) and observes a result of the execution (at 706). The computer system can evaluate, for example, whether the instructions are executable or whether the instructions cannot be executed due to syntax errors, hallucinated API calls, or the like. If the instructions cannot be executed, the computer system can further process the first set of instructions to identify a cause of the error. Some implementations of the system can perform some automated evaluation of the first set of instructions, such as verifying that each tag is closed. Alternatively, the system can send a non-executable line of XML instructions to an LLM, optionally a different LLM than the LLM used to initially produce the XML, to ask the LLM to identify any errors in the non-executable line. Identifications of lines with errors can also be output to a user of the computer system for review by the user.

If the first set of XML instructions can be executed, the computer system can evaluate whether execution of the instructions yields an expected result at 708. For example, if the instruction is to write content to a specified location within a structured digital environment, the computer system evaluates whether the specified location can be found in the environment, whether the content can be identified or generated, and—after performing the write operation—observing whether the correct content was written to the correct location. For example, the computer system may be unable to find a location within the environment if there is no location in the environment that has the name given in the first set of XML instructions. Content may be unidentifiable if the content that is to be written depends on another content item that cannot be located or if the XML instructions fail to properly handle a prompt back into the LLM to generate the content. Similarly, if the instruction is to read a value from the environment, the computer system can evaluate whether execution of the instructions returns a read value or whether the read operation returns a null value.

If execution of the first set of XML instructions does not return an expected result, the computer system can use the LLM to modify the first set of XML instructions, at 710. Depending on the error detected, the system may provide the original set of instructions back to the LLM, with a request to change an aspect of the XML that is produced. For other types of errors, the system can the LLM to generate new instructions or can ask a different LLM to generate the instructions.

The computer system can repeat the operations at 704-710 until a set of instructions that correctly perform the first task has been generated.

Once the first set of XML instructions have been determined to be executable to produce an expected result, the computer system executes the first set of XML, at 712, to perform the first task in the environment. For example, the computer system can write content to the environment or delete content from the environment according to the instructions for the first task.

Finally, at 714, the computer system uses the LLM to generate a second set of XML instructions to perform a second task in the environment. The second set of XML instructions can be generated concurrently with the first set of XML instructions or after the first set of instructions have been determined to produce an expected result, for example. For the second set of instructions, the computer system can use a similar process as that described above to validate the second set of instructions.

Previewing AI Assistant Operations

Some tasks performed by an AI assistant (such as the assistant 120) in a digital environment include a series of sub-tasks or discrete operations. For example, a user may ask the assistant to insert, on each of twenty lines of a table, a summary of a corresponding page within the digital environment. To perform this task, the assistant instructs the LLM to generate code that iteratively processes a corresponding page, generates a summary of the page, and adds the summary to a line of the table—for each of the twenty lines in the table. When performing these tasks, the assistant can wait until the LLM has output a complete portion of the transcript prior to executing any of the computer-readable code generated by the LLM. However, waiting until the code is complete may cause a significant delay between the time the user inputs a command to the assistant and the time the result of the command is implemented within the digital environment because the LLM typically streams characters to the transcript at a relatively slow rate. In the example of generating page summaries for insertion in each of twenty lines of a table, the user may wait tens of seconds before the output is complete. The delay between inputs and outputs can degrade the experience for the user.

According to some implementations, the assistant 120 previews incremental operations within a task while the computer-readable code for performing the task is still being generated. To preview these operations, the assistant 120 manipulates strings within the code generated by the LLM as the code is being streamed to the transcript, forcing the strings into a state in which they can be executed. The assistant 120 sequentially executes these manipulated strings to perform corresponding operations within the digital environment. Continuing the page summary example from above, for instance, the assistant 120 can generate previews by sequentially inserting a summary into a corresponding line of the table, where at least some of the summaries may be inserted before the LLM has finished streaming the code for generating each of these summaries into the transcript. The user therefore can observe sequential performance of at least some of the operations associated with a larger task, which reduces the delay between the user's input and any resulting output within the digital environment. The user can also more readily verify that the assistant 120 is performing the task the user intended to perform, and can optionally stop the assistant from continuing to execute the task if the operations are not being performed as intended.

Figure 8:
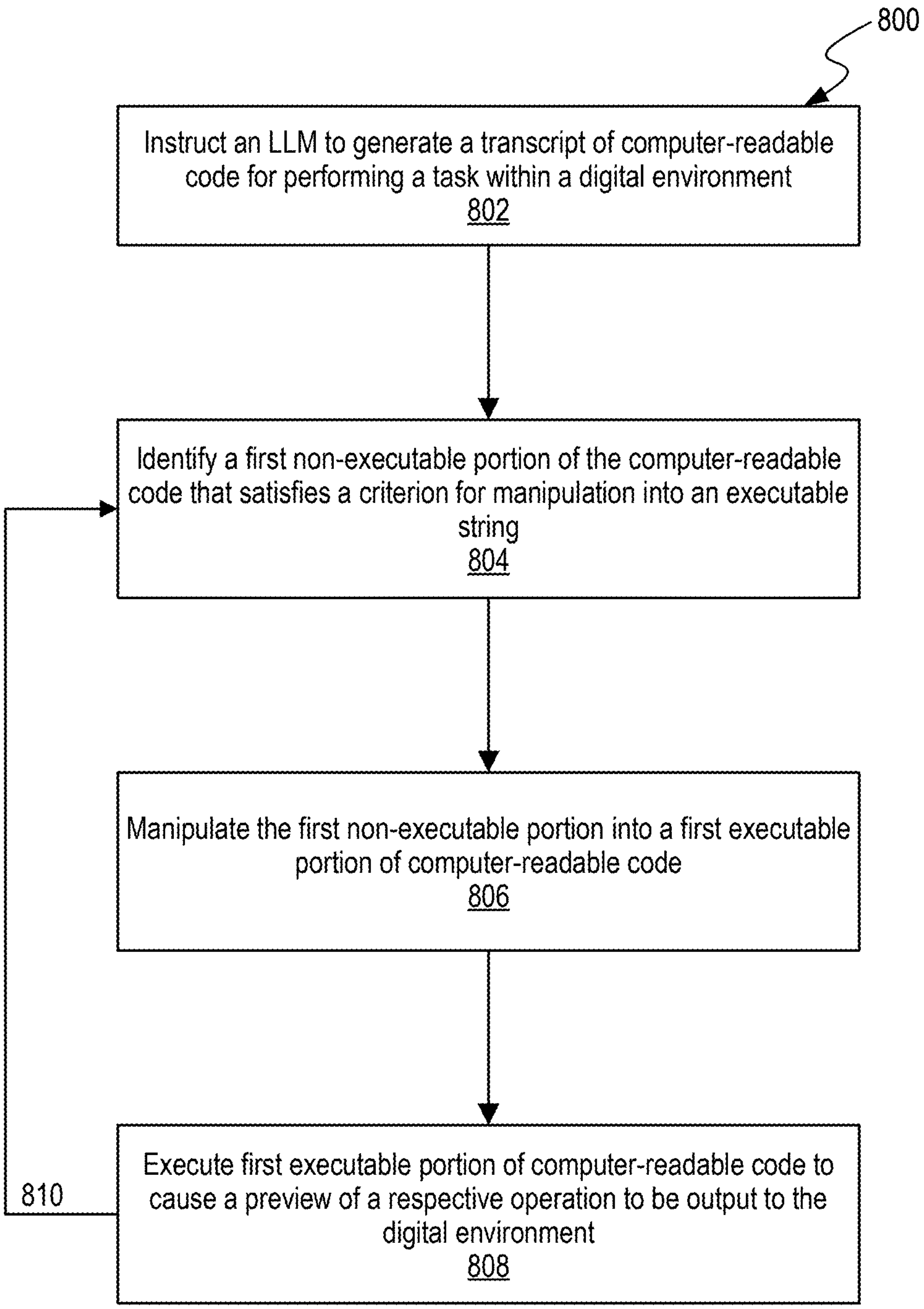
FIG. 8 is a flowchart illustrating a process for previewing AI assistant-generated operations within a digital environment, according to some implementations.

FIG. 8 is a flowchart illustrating a process 800 for previewing AI assistant-generated operations within a digital environment, according to some implementations. The process 800 can be performed by a computing system, such as the assistant 120 described above or a computing system that implements the assistant 120. Other implementations of the process 800 include additional, fewer, or different steps, or perform the steps in different orders. In an example, the digital environment is the controlled environment 110 described with respect to FIG. 1.

At 802, the computing system instructs an LLM to generate a transcript of computer-readable code for performing a task within the digital environment. As described above, the assistant 120 can use the LLM to generate computer-readable code for performing a task in response to natural language inputs from users. The code can include XML, Javascript, a combination of XML and Javascript, or any other computer-readable code written in a markup language, programming language, or machine language. The task can include modifying content on a page of the digital environment, such as adding an object to the page, removing an object from the page, adding text or images to an existing object, removing text or images from an existing object, mutating an object from one object type to another object type, or modifying formatting of objects or text within objects. In another example, the digital environment includes a chat interface for chatting with a user, in which the user enters chat inputs and the assistant 120 generates chat responses by leveraging the LLM. In this case, the task can include generating a chat response to a given user chat input and outputting this chat response via the chat interface. Tasks often can be divided into multiple operations. For example, the task of inserting a summary of another page into a row of a table, as discussed above, includes at least a first operation to insert a first summary into the first row, a second operation to insert a second summary into the second row, and so forth. A task of generating a chat response can include a series of operations to write words, clauses, or paragraphs of the chat response into the chat interface.

Figure 9A:
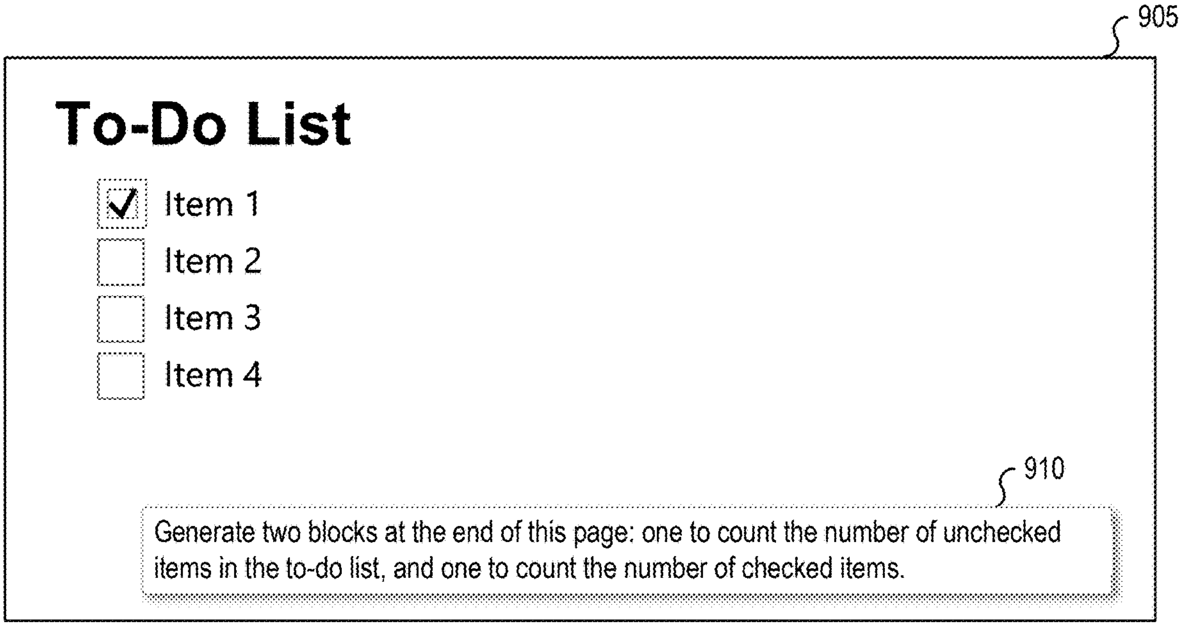
FIGS. 9A-9D illustrate an example digital environment in which previews are generated.
Figure 9B:
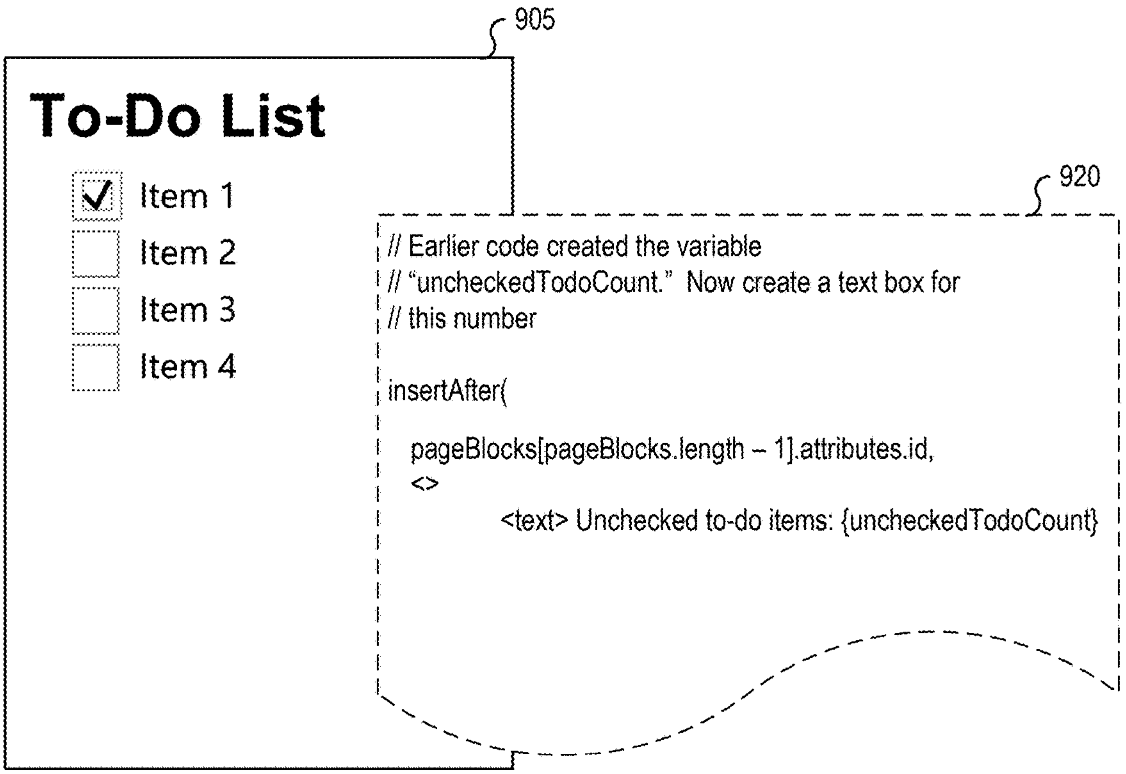

FIG. 9A illustrates an example page 905 in a digital environment, which can be, for example, a webpage or an interface within a web or native application on a user device. In the example, the page contains a to-do list in which a user can check off items for which the user is responsible. As shown, a user has input a natural language command into a text box 910 for instructing the computing system to perform a task, namely, "Generate two blocks at the end of this page: one to count the number of unchecked items in the to-do list, and one to count the number of checked items." In response to the natural language command, the computing system uses an LLM to begin generating a transcript of computer-readable code to perform the task. A partial example transcript 920 is illustrated in FIG. 9B.

While generating the computer-readable code for the task, the LLM typically streams the code to the transcript, such that, for example, one character at a time, a few characters at a time, or a word at a time are output to the transcript. As the code is streamed to the transcript, the computing system iteratively builds and manipulates strings of partially-streamed commands to coerce non-executable strings into valid, executable formats.

To coerce strings of partially-streamed commands into an executable form, the computing system at 804 in FIG. 8 identifies a first non-executable portion of the computer-readable code that satisfies a criterion for manipulation into an executable string. The criterion can generally include a mechanism used by the computing system to evaluate if a string can be readily manipulated into a valid form.

In some cases, the criterion employed by the computing system is used to determine whether a string includes enough code from the LLM for the computing system to be able to generate a valid, executable command or set of commands. The criterion can specify, for example, that a string has an unclosed tag or bracket, where closing the tag or bracket would enable the string to be executed. Some criteria can specify that a string should match a given regular expression of a set of specified regular expressions. The set of regular expressions can indicate patterns of characters that are expected to be present in executable portions of code. For example, one regular expression in the set may specify a valid tag structure for certain XML operations. Another regular expression in the set may specify a valid syntax for a Javascript function call, with an expected number of parameters that are input to the function.

The computing system can further use a criterion that causes the computing system to predict a processing cost for a portion of code. Processing cost can take into account running time for a segment of code, memory usage by the portion of code, expected latencies for calls or queries to external data sources or APIs, or the like. For example, the computing system can predict the processing cost by applying a computational model that calculates a running time for a segment of code, such as a worst or best case running time or an average running time. Alternatively, the computing system can apply a set of rules or heuristics. For example, the computing system can employ a rule that a certain operation will take too long or will employ too much memory to effectively execute a preview of the operation. The processing cost criterion may cause the computing system to only manipulate the code into an executable form if the processing cost is less than a specified threshold. For example, if a first operation associated with a task has a high predicted running time but is not on a critical path for other operations within the task, the computing system can bypass the first operation while manipulating streaming code for other operations into forms that can be executed. Alternatively, the criterion can cause the computing system to divide an operation into further smaller operations that can each be performed with a below-threshold processing cost. For example, if a portion of the code generated by the LLM iterates over a large array to perform an action with respect to each element in the array, the computing system can determine that the code can be reworked such that the system can output an action performed on each element in the array (or smaller sets of elements) before the iteration over the entire array has been completed.

Once the computing system has identified a string that satisfies the manipulation criterion, the computer system manipulates at 806, the first non-executable portion into a first executable portion of computer-readable code. When, for example, the computing system determines that a portion of code is non-executable because it is missing a closing tag or bracket, the computing system can insert the requisite closing tag or bracket into a string containing the portion of code. When the computing system determines that a string matches a given regular expression, the computing system can use the regular expression to modify the string into an executable form. The computing system can also add subsequently streamed code into a previously manipulated string such that the entire string, with previously streamed portions and subsequently streamed portions, can be executed together.

Figure 9C:
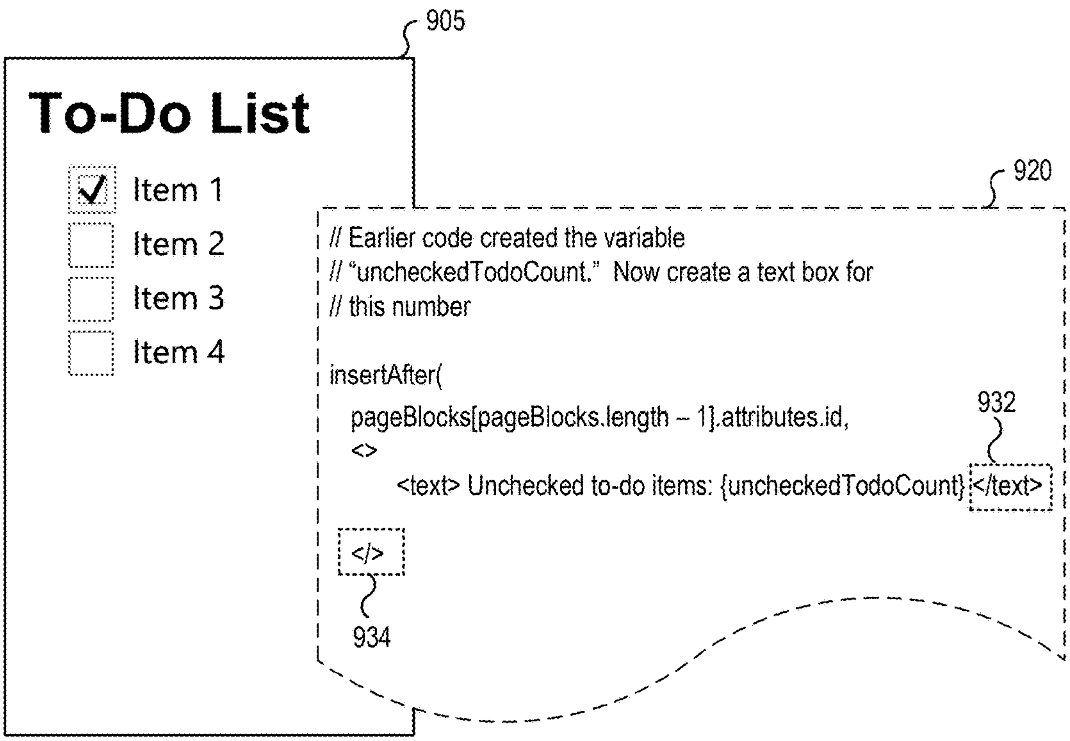

FIG. 9C illustrates an example string manipulation that is performed on the example partial transcript 920. The computing system can determine in this example that a portion of the code in the transcript 920 as shown in FIG. 9B is not executable because it is missing two closing tags. As shown in FIG. 9C, the computing system inserts a tag 932 and a tag 934 into the transcript to coerce at least a portion of the code in the transcript 920 into a valid state.

Figure 9D:
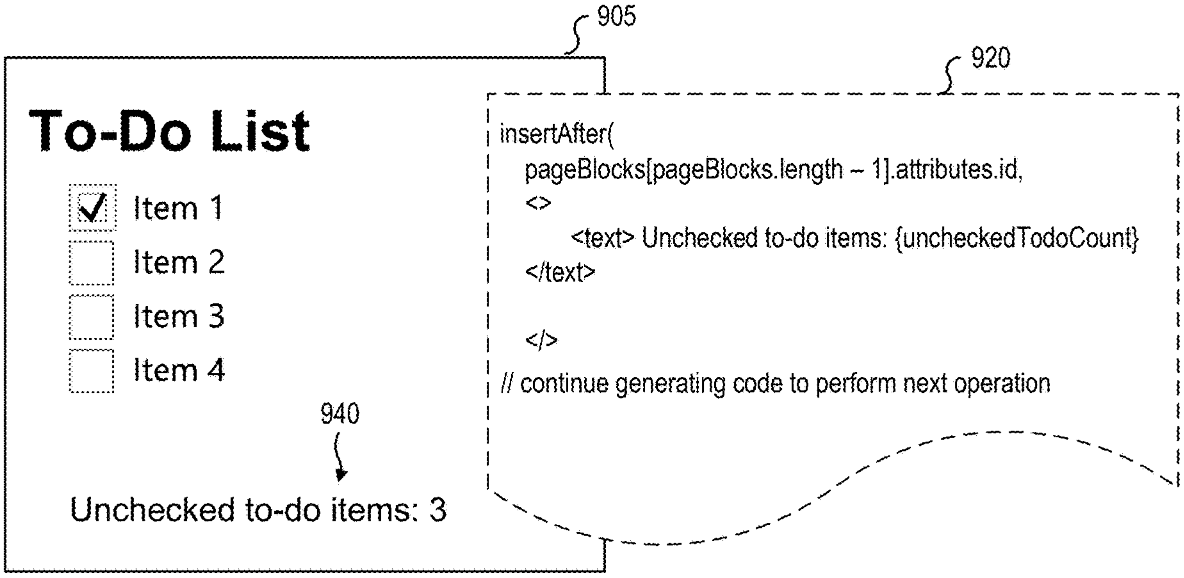

At 808, the computing system executes the first executable portion of computer-readable code to cause a preview of a corresponding operation to be output to the digital environment. FIG. 9D illustrates, for example, that the computing system can execute the modified code in the transcript 920 to insert a text block 940 at the bottom of the page 905, which contains the text "Unchecked to-do items:" and a count of the items in the to-do list that are unchecked. During and after insertion of this text block 940, the LLM may continue streaming additional code to the transcript 920 to perform additional operations, such as the operation to generate a text block that counts the number of checked items in the to-do list. As the previews are output to the digital environment, some implementations of the computing system cause the previews to flash or displays the previews in a different color or size than other items in the digital environment, enhancing the user's observation of the previews as they are generated.

The computing system can iteratively repeat the processes at 804, 806, and 808 (as indicated by arrow 810), such that the computing system iteratively manipulates strings within the transcript to generate respective executable portions of code from partially streamed outputs from the LLM and sequentially executes these portions of code to preview their operations within the digital environment.

In some implementations, the computing system does not commit the operations to the digital environment until the LLM has completed the transcript. For example, the operations can be previewed locally on the device the user is using to view the digital environment and input task instructions. If the user confirms that the task was performed correctly based on the previews, the computing system stores the transcript and commits the task result to the environment, such that other users accessing the digital environment can also view the task result.

Computer System

Figure 10:
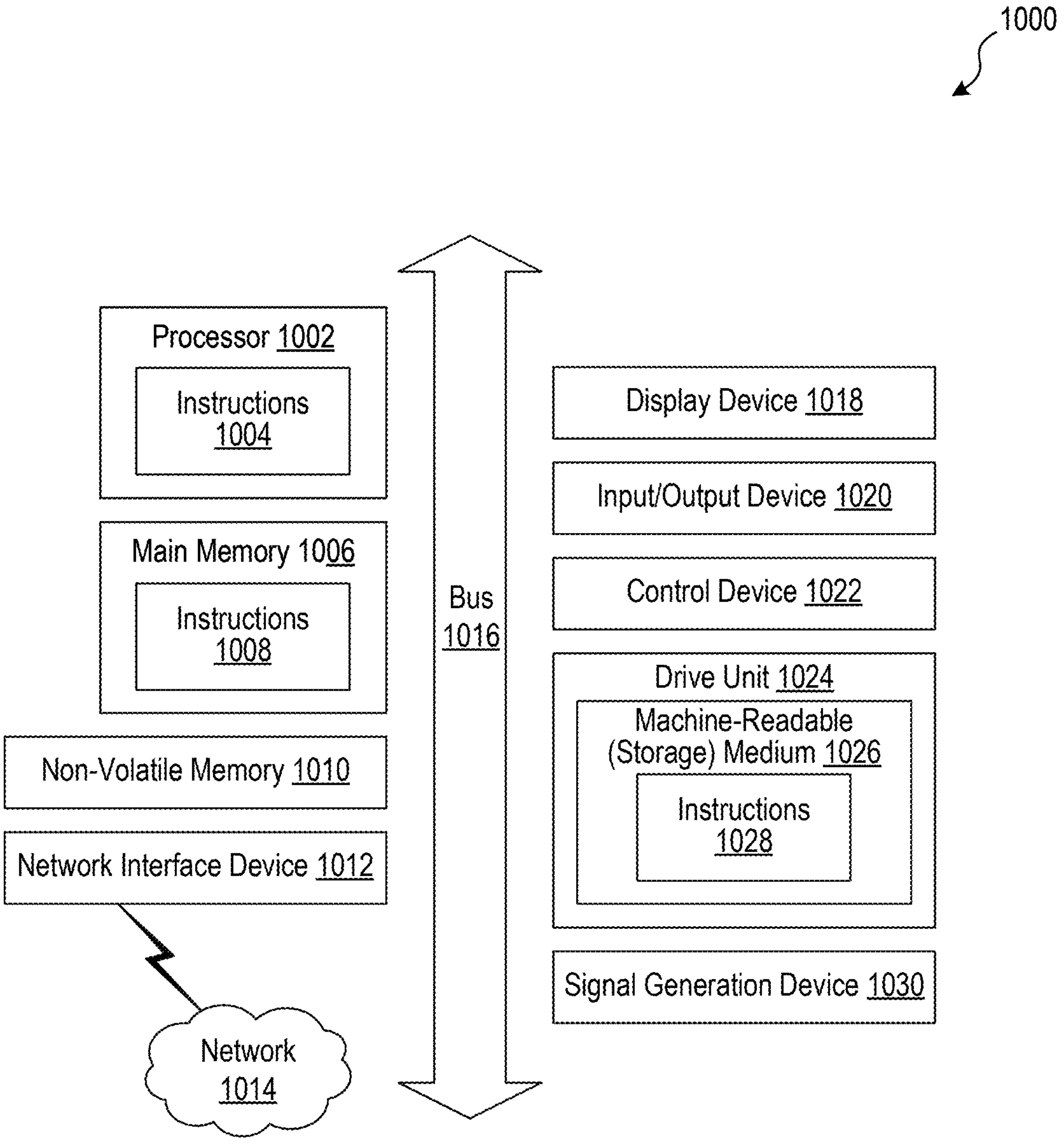
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a display device 1018, an input/output device 1020, a control device 1022 (e.g., keyboard and pointing device), a drive unit 1024 that includes a machine readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computer system 1000 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer (SBC) system, or a distributed system such as a mesh of computer systems or include one or more cloud components in one or more networks. Where appropriate, one or more computer systems 1000 can perform operations in real time, near real time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions recorded thereon, wherein the instructions, when executed by at least one data processor of a system, cause the system to:

instruct a large language model (LLM) to generate a transcript of computer-readable code for performing a task within a digital environment;

wherein the LLM is configured to stream the computer-readable code to the transcript as the computer-readable code is generated; and wherein the task includes a plurality of operations to be performed within the digital environment;

identify a set of strings of the transcript that are not executable and are manipulable to be executable;

while the LLM streams the computer-readable code to the transcript, iteratively manipulate one or more strings of the set of strings within the transcript, before the LLM has completed streaming the computer-readable code to the transcript, to generate executable portions of the computer-readable code from partially streamed outputs from the LLM; and sequentially execute the generated executable portions of the computer-readable code to cause a preview of each of the plurality of operations to be sequentially output to the digital environment.

2. The non-transitory, computer-readable storage medium of claim 1, wherein the instructions when executed further cause the system to:

receive a natural language input to perform the task within the digital environment; and generate an instruction to the LLM to generate the transcript based on the natural language input.

3. The non-transitory, computer-readable storage medium of claim 1, wherein iteratively manipulating strings within the transcript comprises:

detecting a first non-executable string satisfies a criterion; and manipulating the first non-executable string into a first executable string in response to detecting the first non-executable string satisfies the criterion.

4. The non-transitory, computer-readable storage medium of claim 3, wherein the criterion includes the first non-executable string having an unclosed tag or bracket, and wherein manipulating the first non-executable string into the first executable string comprises adding a closing tag or bracket to the first non-executable string.

5. The non-transitory, computer-readable storage medium of claim 3, wherein the criterion includes the first non-executable string matching a regular expression of a set of regular expressions, and wherein manipulating the first non-executable string into the first executable string comprises manipulating the string based on the matching regular expression.

6. The non-transitory, computer-readable storage medium of claim 3, wherein the criterion includes the first non-executable string being manipulable into a string for which a processing cost for execution is less than a specified threshold, and wherein the first non-executable string is manipulated into the first executable string in response to determining the processing cost for the first executable string is below the threshold.

7. The non-transitory, computer-readable storage medium of claim 1, wherein at least one of the previews of an operation of the plurality of operations is output to the digital environment while the LLM is streaming the computer-readable code to the transcript.

8. The non-transitory, computer-readable storage medium of claim 1, wherein the instructions when executed further cause the system to:

commit the preview of each of the plurality of operations to the digital environment in response to receiving confirmation from a user.

9. The non-transitory, computer-readable storage medium of claim 1, wherein the task includes modifying content on a page of the digital environment.

10. The non-transitory, computer-readable storage medium of claim 1, wherein the digital environment includes a chat interface for receiving user chat inputs and for outputting chat responses generated by the system based on the user chat inputs, and wherein the task includes generating a chat response for output via the chat interface.

11. A system comprising:

at least one hardware processor; and at least one non-transitory memory storing instructions, which, when executed by the at least one hardware processor, cause the system to:

instruct a large language model (LLM) to generate a transcript of computer-readable code for performing a task within a digital environment;

wherein the LLM is configured to stream the computer-readable code to the transcript as the computer-readable code is generated, and wherein the task includes a plurality of operations to be performed within the digital environment; and during generation of the transcript:

identify a set of strings of the transcript that are not executable and are manipulable to be executable;

iteratively manipulate one or more strings of the set of strings of the transcript, before the LLM has completed streaming the computer-readable code to the transcript, to generate executable portions of the computer-readable code from partially streamed outputs from the LLM; and sequentially execute the generated executable portions of the computer-readable code to cause a preview of each of the plurality of operations to be sequentially output to the digital environment.

12. The system of claim 11, wherein the instructions when executed further cause the system to:

receive a natural language input to perform the task within the digital environment; and generate an instruction to the LLM to generate the transcript based on the natural language input.

13. The system of claim 11, wherein the instructions when executed further cause the system to:

commit the preview of each of the plurality of operations to the digital environment in response to receiving confirmation from a user.

14. The system of claim 11, wherein the task includes modifying content on a page of the digital environment.

15. The system of claim 11, wherein the digital environment includes a chat interface for receiving user chat inputs and for outputting chat responses generated by the system based on the user chat inputs, and wherein the task includes generating a chat response for output via the chat interface.

16. The system of claim 11, wherein iteratively manipulating strings within the transcript comprises:

detecting a first non-executable string satisfies a criterion; and manipulating the first non-executable string into a first executable string in response to detecting the first non-executable string satisfies the criterion.

17. A method comprising:

Instructing, by a computer system, a large language model (LLM) to generate a transcript of computer-readable code for performing a task within a digital environment;

wherein the LLM is configured to stream the computer-readable code to the transcript as the computer-readable code is generated; and wherein the task includes a plurality of operations to be performed within the digital environment;

identifying a set of strings of the transcript that are not executable and are manipulable to be executable;

while the LLM streams the computer-readable code to the transcript, iteratively manipulating one or more strings of the set of strings within the transcript, by the computer system and before the LLM has completed streaming the computer-readable code to the transcript, to generate executable portions of the computer-readable code from partially streamed outputs from the LLM; and sequentially executing the generated executable portions of the computer-readable code, by the computer system, to cause a preview of each of the plurality of operations to be sequentially output to the digital environment.

18. The method of claim 17, wherein iteratively manipulating strings within the transcript comprises:

detecting a first non-executable string satisfies a criterion; and manipulating the first non-executable string into a first executable string in response to detecting the first non-executable string satisfies the criterion.

19. The method of claim 18, wherein the criterion includes one or more of:

the first non-executable string having an unclosed tag or bracket, wherein manipulating the first non-executable string into the first executable string comprises adding a closing tag or bracket to the first non-executable string;

the first non-executable string matching a regular expression of a set of regular expressions, wherein manipulating the first non-executable string into the first executable string comprises manipulating the string based on the matching regular expression; or the first non-executable string being manipulable into a string for which a processing cost for execution is less than a specified threshold, wherein the first non-executable string is manipulated into the first executable string in response to determining the processing cost for the first executable string is below the threshold.

20. The method of claim 17, wherein at least one of the previews of an operation of the plurality of operations is output to the digital environment while the LLM is streaming the computer-readable code to the transcript.

* * * * *